United States Patent
Forestier et al.

(10) Patent No.: US 9,284,071 B2
(45) Date of Patent: Mar. 15, 2016

(54) DEVICE AND METHOD FOR DEORBITING OF A SATELLITE

(71) Applicant: THALES, Neuilly-sur-Seine (FR)

(72) Inventors: Damien Forestier, Pegomas (FR);
Laurent Houis, Cannes la Bocca (FR);
Sebastien Herbiniere, Mandelieu (FR)

(73) Assignee: Thales, Courbevoie (FR)

( * ) Notice: Subject to any disclaimer, the term of this patent is extended or adjusted under 35 U.S.C. 154(b) by 348 days.

(21) Appl. No.: 13/953,454

(22) Filed: Jul. 29, 2013

(65) Prior Publication Data

US 2014/0034784 A1    Feb. 6, 2014

(30) Foreign Application Priority Data

Aug. 3, 2012 (FR) .................................... 12 02180

(51) Int. Cl.
*B64G 1/62* (2006.01)
*B64G 1/24* (2006.01)
*B64G 1/26* (2006.01)
*B64G 1/36* (2006.01)

(52) U.S. Cl.
CPC *B64G 1/62* (2013.01); *B64G 1/242* (2013.01); *B64G 1/26* (2013.01); *B64G 1/363* (2013.01); *B64G 1/366* (2013.01); *B64G 1/36* (2013.01)

(58) Field of Classification Search
CPC ....................................................... B64G 1/62
USPC ........................................ 701/13; 244/158.6
See application file for complete search history.

(56) References Cited

U.S. PATENT DOCUMENTS

| | | | | | |
|---|---|---|---|---|---|
| 4,617,634 | A | * | 10/1986 | Izumida | .................... B64G 1/24 244/164 |
| 5,452,869 | A | * | 9/1995 | Basuthakur et al. | .......... 244/164 |
| 5,546,309 | A | * | 8/1996 | Johnson | ................ G01S 3/7862 244/164 |
| 6,024,327 | A | | 2/2000 | Won et al. | |
| 6,237,876 | B1 | | 5/2001 | Barker | |
| 6,266,616 | B1 | * | 7/2001 | Needelman | .................... 701/513 |
| 6,622,969 | B2 | * | 9/2003 | Yamashita | ..................... 244/165 |
| 8,346,410 | B2 | * | 1/2013 | Seo | .......................... B64G 1/26 244/158.1 |
| 8,706,322 | B2 | * | 4/2014 | Johnson | ................. B64G 1/281 244/164 |
| 2003/0009284 | A1 | * | 1/2003 | Needelman et al. | .......... 701/222 |
| 2003/0093194 | A1 | * | 5/2003 | Li et al. | ............................ 701/13 |
| 2005/0113986 | A1 | * | 5/2005 | Prakash et al. | .................. 701/13 |
| 2005/0133671 | A1 | | 6/2005 | Wang et al. | |
| 2007/0023579 | A1 | * | 2/2007 | Wang | .................... G05D 1/0883 244/158.6 |

OTHER PUBLICATIONS

Hiroki Ashida, et al., "Design of Tokyo Tech nano-satellite Cute-1.7 + APD II and its operation", Acta Astronautica, May 1, 2010, pp. 1412-1424, vol. 66, No. 9-10, Pergamon Press, Elmsford, GB, XP026939209.

* cited by examiner

*Primary Examiner* — Muhammad Shafi
*Assistant Examiner* — Majdi Alsomiri
(74) *Attorney, Agent, or Firm* — Baker & Hostetler LLP

(57) ABSTRACT

The present disclosure relates to the deorbiting of satellites in low orbit that have entered safe hold mode. A device makes it possible to decide in an autonomous manner and on the basis of information existing in the satellite, when and where to trigger a series of short thruster manoeuvres to modify the satellite orbit with the aim of deorbiting.

9 Claims, 3 Drawing Sheets

DEVICE AND METHOD FOR DEORBITING OF A SATELLITE

CROSS-REFERENCE TO RELATED APPLICATION

This application claims priority to foreign French patent application No. FR 1202180, filed on Aug. 3, 2012, the disclosure of which is incorporated by reference in its entirety.

FIELD OF THE INVENTION

The invention relates to the field of telecommunications satellites and in particular the deorbiting of satellites in low orbit.

BACKGROUND

At the end of its life, any satellite from a constellation of satellites must be deorbited. The attitude and orbit control system of the satellites of the constellation nominally contains a mode used for deorbiting called Orbit Control Mode (OCM).

If, following a major breakdown, the satellite is sent into Safe Hold Mode (SHM) and can no longer attain the deorbiting mode OCM, the satellite can then no longer be deorbited. In fact, the safe hold mode SHM consists of an attitude control mode in which the satellite is kept pointed towards the sun with a slow angular velocity of rotation around the sun-satellite direction by using:
  Magneto Torquer Bars (MTB) as main actuator;
  reaction wheels to provide gyroscopic rigidity in order to maintain sun-pointing performance in an eclipse of the sun by the Earth despite the cessation of control by the MTBs (since location of the sun is impossible in an eclipse);
  Cosine Sun Sensors (CSS) which make it possible to ascertain the direction of the solar vector and therefore the guidance of the satellite; and
  Magnetometer sensors (MAG) which make it possible to measure the magnetic field for the estimation of the angular velocity of the satellite and the control of the MTBs.

The deorbiting mode OCM requires a satellite attitude pointed to the centre of the Earth, which is not in agreement with the guidance of the safe hold mode SHM. In fact, the direction of thrust of the thrusters (THR), the actuators used for generating a force to accelerate or brake the satellite, is in constant rotation, which prevents it from maintaining this axis in the orbital plane and a fortiori from maintaining it collinear with the satellite velocity vector.

The problem to solve is that of controlling the satellite in order to set up adequate conditions for aligning the axis of the THR thrusters with the satellite velocity vector. Such control presupposes measurement of the attitude of the satellite.

Known methods for providing satellite attitude measurements use equipment such as Star Trackers (STR), Gyrometers (GYR) or Infra Red Earth Sensors (IRES). However, these devices are not available on a constellation of satellites in safe hold mode.

In fact, the constellation of satellites in flight does not possess such equipment in safe hold mode. Only basic but robust sensors such as the sun sensors CSS and the magnetometers MAG are available. In safe hold mode, only sun-pointed attitude control is available.

The existing solutions are therefore not compatible with the existing hardware configurations of these satellites. Furthermore, they do not present a sufficient level of robustness to allow use of a greatly reduced set of sensors and actuators.

Thus, a solution for deorbiting a satellite is needed that is compatible with the devices available in safe hold mode.

SUMMARY OF THE INVENTION

The proposed solution makes it possible to perform a deorbiting of a satellite in low orbit from safe hold mode while keeping a sun-pointed satellite attitude with a velocity of rotation around the sun direction.

An object of the present invention is to offer a solution compatible with the hardware configuration of satellites already in flight.

Advantageously, the present invention does not require new devices, or new attitude control designs.

Advantageously, the method of the invention makes it possible to perform short THR manoeuvres (or "boosts") when the direction of the force generated by the THRs is collinear with the satellite velocity vector.

Advantageously, the method of the invention makes it possible to predict boost occurrences with a reduced set of basic sensors.

Still advantageously, the method of the invention makes it possible to predict the occurrences of boosts in an eclipse of the sun by the earth when the sun sensors are unavailable.

To obtain the desired results, a device as described in independent claim 1 and a method as described in independent claim 8 are proposed.

In particular, a device for deorbiting of a satellite in safe hold mode comprises:
  a data acquisition module capable of providing:
    the direction of the terrestrial magnetic field and the satellite-sun direction in the satellite reference frame; and
    a prediction of the direction of the terrestrial magnetic field and the satellite—sun direction in the local orbital reference frame;
  an attitude estimation module coupled to the data acquisition module for determining the attitude of the satellite in relation to the local orbital reference frame, the angle between the sun direction and the satellite Z-axis and the position on the orbit of the satellite; and
  a boost generation module coupled to the attitude estimation module for generating signals capable of activating the thrusters of the satellite when the attitude, angle and position values are equal to predefined values.

Various different embodiments are described in the dependent claims.

DETAILED DESCRIPTION

Various features and advantages of the invention will appear in support of the description of a preferred embodiment of the invention.

Figure 1:
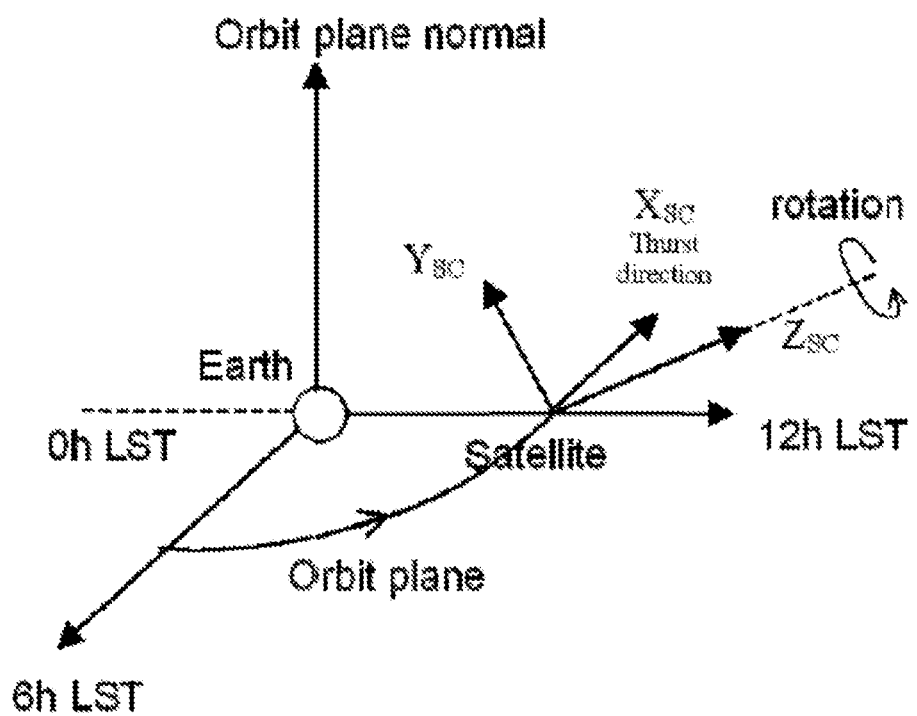
FIG. 1 is a representation of the principle of attitude control of a satellite in safe hold mode SHM in a particular position.

FIG. 1 illustrates the principle of attitude control of a satellite in safe hold mode SHM in a particular position of the satellite.

A satellite as represented by the trihedron (Xsc Ysc Zsc) in the figure is sun-pointed and in rotation around the sun direction.

The sun-pointed satellite implies a satellite direction Zsc normal to the antenna panel directed towards the sun.

The thrusters can generate a force collinear with the X-axis of the satellite and which must be maintained in the plane of the orbit according to the orbital track of the satellite. More precisely, the force must be maintained collinear with the satellite velocity vector. This situation can occur twice per orbit only when the satellite is in safe hold mode SHM.

FIG. 1 illustrates the moment when the satellite is at midday local time LST (subsolar point). However, the principles described also apply to the moment when the satellite is at midnight local satellite time.

The method of deorbiting of the present invention makes it possible to increase the semi-major axis of the orbit by producing thruster boosts for generating increments of satellite linear velocity, collinear with the satellite velocity vector.

Figure 2:
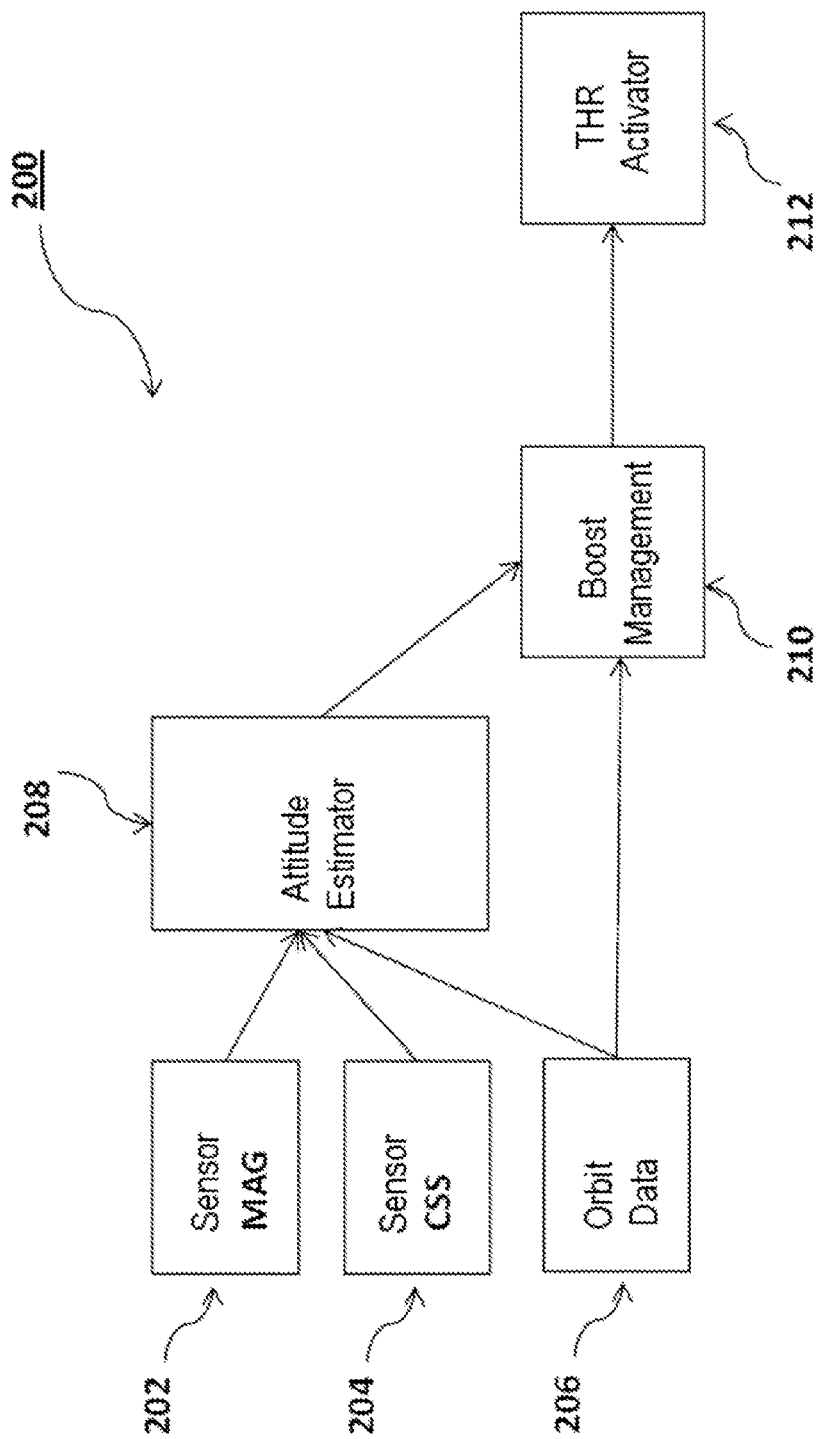
FIG. 2 is a block diagram of the deorbiting system of the present invention.

FIG. 2 is a block diagram showing the main elements constituting the deorbiting system 200 in safe hold mode of the present invention.

The system comprises a MAG sensor 202, a CSS 204 and a database of satellite orbit information 206, coupled to an attitude estimator 208.

A boost manager 210 is coupled at the input to the attitude estimator 208 and at the output to an actuator THR 212.

Advantageously, the solution proposed is compatible with existing satellite configurations.

The MAG sensor 202 provides three image voltages reflecting the amplitude of the magnetic field projected onto the three measurement axes of the sensor. These items of information make it possible to measure the direction of the terrestrial magnetic field in the satellite reference frame.

The CSS 204 captures the solar flux received by the sensor and provides an image current reflecting this flux. The current measurements of the eight CSSs make it possible to reconstruct the satellite-sun direction in the satellite reference frame.

The on-board knowledge of the satellite orbit ORBIT 206 makes it possible to predict the direction of the magnetic field and the satellite-sun direction in the local orbital reference frame. These items of information are obtained from data issued by a Global Positioning System (GPS), completed by an On-board Orbit Propagator (OOP). However, the use of a GPS is not obligatory: an orbit propagator OOP updated regularly from a ground control station is enough to power this module for the prediction of the sun direction and the direction of the terrestrial magnetic field.

The attitude estimator 208 receives at the input the information from the sensors and from the orbit propagator of the satellite, to process it and calculate the phasing of the satellite thrust vector with the satellite velocity vector.

The information delivered by the attitude estimator makes it possible for the boost manager 210 to generate a signal which triggers (or does not trigger) a series of thruster boosts by the activator THR 212. This automation of boosts 210 can be activated or deactivated from the ground by the satellite operator.

Figure 3:
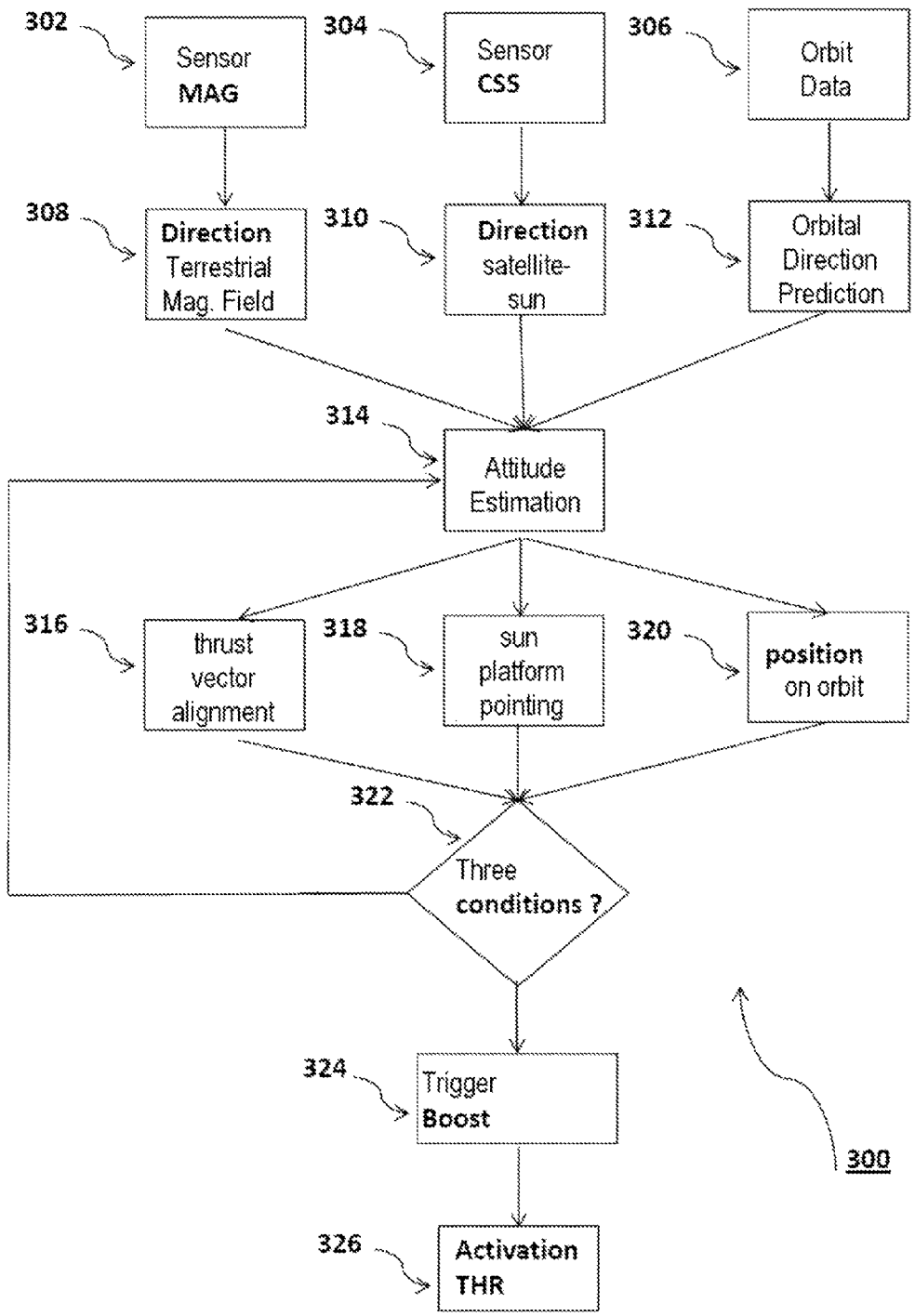
FIG. 3 is a diagram describing the steps of triggering of the boosts according to the principles of the invention.

FIG. 3 shows the steps leading to the triggering of the boosts according to the principles of the invention in the form of a process diagram.

The method begins with the steps 302, 304, and 306 of acquisition of data by the MAG, CSS and ORBIT sensors respectively.

In the course of the steps 308, 310 and 312 each sensor respectively delivers an item of directional information:

direction of the terrestrial magnetic field in the satellite reference frame for the MAG sensor (308);

satellite-sun direction in the satellite reference frame for the CSS (310); and prediction of the direction of the magnetic field and of the satellite in the orbital reference frame for the ORBIT (312).

In step 314, the items of directional information are received by the attitude estimator, which processes them.

In step 316, the attitude estimator generates the satellite attitude information in relation to the local orbital reference frame, in order to verify the criterion of alignment of the thruster's thrust vector (satellite X) with the satellite velocity vector. This estimation is preferably achieved by way of a Kalman filter, which makes it possible to propagate these items of information in an eclipse of the sun by the Earth or the Moon following the unavailability of solar measurements.

In step 318, the attitude estimator generates a value of the angle between the sun direction and the satellite Z-axis in order to verify the sun-pointing performance.

In step 320, the attitude estimator generates the information of the position on the orbit of the satellite in order to verify the condition of proximity of the satellite in relation to the two favourable positions, midday and midnight local time.

Step 322 consists in verifying a triple condition from the three parameters calculated in the preceding steps 316, 318 and 320. The method tests:

if the satellite has a satisfactory sun pointing, i.e. if the satellite Z-axis and the sun direction have a small angular separation (typically a few degrees); and if the axis of thrust THR of the satellite and the linear velocity vector of the satellite have a small angular separation (typically a few degrees); and if the angular position of the satellite on the orbit is at a small distance from one of the two positions on the reference orbit (midday or midnight LST), typically a few tens of degrees.

If one of the three conditions is not satisfied, the method loops back to step 314.

If the three conditions are simultaneously satisfied (sun-pointing performance OK, phasing of THR direction with velocity vector OK, position on the orbit OK), the method continues to step 324 to allow the triggering of thruster boosts.

The method ends in step 326 by the sending of THR activation sequences paramaterizable from the ground (typically a few tens of seconds on each THR).

Thus the present description illustrates a preferred embodiment of the invention, but is not limiting. An example has been chosen to allow a good understanding of the principles of the invention, and a concrete application, but it is in no way exhaustive and must allow those skilled in the art to make modifications and variant embodiments while keeping the same principles.

The present invention can be implemented from hardware and/or software elements. It can be available as a computer program product on a medium readable by computer. The medium may be electronic, magnetic, optical, electromagnetic or be an infra-red type broadcasting channel. For example, such media may be semi-conductor memories (Random Access Memory RAM, Read-Only Memory ROM), tapes, diskettes or magnetic or optical disks (Compact Disk-Read Only Memory (CD-ROM), Compact Disk-Read/Write (CD-R/W) and DVD).

The invention claimed is:

1. A device for deorbiting of a satellite in safe hold mode comprising:
a data acquisition module capable of providing:
the direction of the terrestrial magnetic field and the satellite-sun direction in the satellite reference frame; and
a prediction of the direction of the terrestrial magnetic field and the satellite-sun direction in the local orbital reference frame;
an attitude estimation module coupled to the data acquisition module for determining the attitude of the satellite in relation to the local orbital reference frame, the angle between the sun direction and the satellite Z-axis and the position on the orbit of the satellite;
a boost generation module coupled to the attitude estimation module for generating signals capable of activating the thrusters of the satellite when the attitude, angle and position values are equal to predefined values.

2. The device according to claim 1, in which the data acquisition module comprises:
a sensor capable of providing the direction of the terrestrial magnetic field in the satellite reference frame;
a sensor capable of providing the satellite-sun direction in the satellite reference frame; and
an orbit propagator capable of predicting the direction of the terrestrial magnetic field and the satellite-sun direction in the local orbital reference frame.

3. The device according to claim 1, in which the boost generation module comprises a module for comparing attitude, angle and position values to predefined values.

4. The device according to claim 3, in which the module for comparing attitude comprises a module for determining whether:
the satellite Z-axis is close to the sun direction;
the satellite has a thrust axis close to the linear velocity vector;
the satellite is close to a position on the reference orbit.

5. The device according to claim 1, in which the satellite is in low orbit.

6. The device according to claim 1, in which the estimation module moreover comprises a Kalman filter.

7. A satellite comprising:
a device for deorbiting of a satellite in safe hold mode, the device comprising:
a data acquisition module capable of providing:
the direction of the terrestrial magnetic field and the satellite-sun direction in the satellite reference frame; and
a prediction of the direction of the terrestrial magnetic field and the satellite-sun direction in the local orbital reference frame;
an attitude estimation module coupled to the data acquisition module for determining the attitude of the satellite in relation to the local orbital reference frame, the angle between the sun direction and the satellite Z-axis and the position on the orbit of the satellite;
a boost generation module coupled to the attitude estimation module for generating signals capable of activating the thrusters of the satellite when the attitude, angle and position values are equal to predefined values.

8. A method for deorbiting a satellite in a safe hold mode comprising the steps of:
acquiring, at a sensor of a satellite, data relating to:
the direction of the terrestrial magnetic field and the satellite-sun direction in the satellite reference frame; and
a prediction of the direction of the terrestrial magnetic field and the satellite-sun direction in the local orbital reference frame;
determining, at an attitude estimator, the attitude of the satellite in relation to the local orbital reference frame, the angle between the sun direction and the satellite Z-axis and the position on the orbit of the satellite;
comparing, using a computer, the determined attitude, angle and position values to predefined values; and
generating signals, using a boost manager, capable of activating the thrusters of the satellite according to the result of the comparison for generating increments of satellite linear velocity, collinear with the satellite velocity vector.

9. A non-transitory computer readable medium including a computer program product, said computer program product comprising instructions in code to perform deorbiting a satellite in a safe hold mode, when said code is executed on a computer to implement:
acquiring, at a sensor of a satellite, data relating to:
the direction of the terrestrial magnetic field and the satellite-sun direction in the satellite reference frame; and
a prediction of the direction of the terrestrial magnetic field and the satellite-sun direction in the local orbital reference frame;
determining, at an attitude estimator, the attitude of the satellite in relation to the local orbital reference frame, the angle between the sun direction and the satellite Z-axis and the position on the orbit of the satellite;
comparing, using the computer, the determined attitude, angle and position values to predefined values; and
generating signals, using a boost manager, capable of activating the thrusters of the satellite according to the result of the comparison for generating increments of satellite linear velocity, collinear with the satellite velocity vector.

* * * * *